(12) United States Patent
Nelson et al.

(10) Patent No.: US 6,465,772 B1
(45) Date of Patent: Oct. 15, 2002

(54) OPTICAL ENCODER HAVING MULTIPLE THUMBWHEELS WITH INTEGRAL ENCODER PATTERNS

(75) Inventors: Terrence Leroy Nelson, Aloha; Richard Alan Leinen, Wilsonville, both of OR (US)

(73) Assignee: NSI Corporation, Tualatin, OR (US)

( * ) Notice: Subject to any disclaimer, the term of this patent is extended or adjusted under 35 U.S.C. 154(b) by 0 days.

(21) Appl. No.: 09/177,844

(22) Filed: Oct. 22, 1998

Related U.S. Application Data

(60) Provisional application No. 60/063,217, filed on Oct. 23, 1997.

(51) Int. Cl.[7] ................................................. G01D 5/34
(52) U.S. Cl. ............................ 250/231.15; 250/231.16
(58) Field of Search ...................... 250/231.15, 231.16, 250/231.13; 340/870.02, 870.03; 341/11, 13

(56) References Cited

U.S. PATENT DOCUMENTS

| | | | | |
|---|---|---|---|---|
| 3,959,628 A | * | 5/1976 | Haydon ................. | 250/231.13 |
| 4,806,751 A | * | 2/1989 | Abe et al. ............... | 250/231.13 |
| 5,565,861 A | * | 10/1996 | Mettler et al. ......... | 340/870.02 |
| 5,640,007 A | * | 6/1997 | Talbott et al. ......... | 250/231.15 |

* cited by examiner

Primary Examiner—Que T. Le
(74) Attorney, Agent, or Firm—Marger Johnson & McCollom, PC

(57) ABSTRACT

An optical encoder assembly reduces the space required to mount multiple thumbwheels on a control panel by utilizing wheels with integral encoder patterns. An encoder pattern comprising two tracks of reflective dots is attached to the side of each wheel. Two optical transceivers are mounted on a printed circuit board next to each wheel so that the pattern elements in each of the tracks move past one of the transceivers as the wheels rotate. The transceivers send electrical pulses to a microprocessor each time a dot passes a transceiver. The dots in the two tracks are offset circumferentially to provide a 90 degree phase shift between the tracks as the wheels rotate on a common shaft. The use of dots reduces blurring of the pulse signals. A chassis is mounted to the panel and supports the shaft, the printed circuit board, and a rubber dust shield which rubs against the wheels to provide braking action. The chassis, printed circuit board and dust shield all include slots through which the wheels rotate. Protrusions in the printed circuit board slots guide the wheels as they rotate, and protrusions in the dust shield slots rub against the sides of the wheels to provide the braking action.

28 Claims, 7 Drawing Sheets

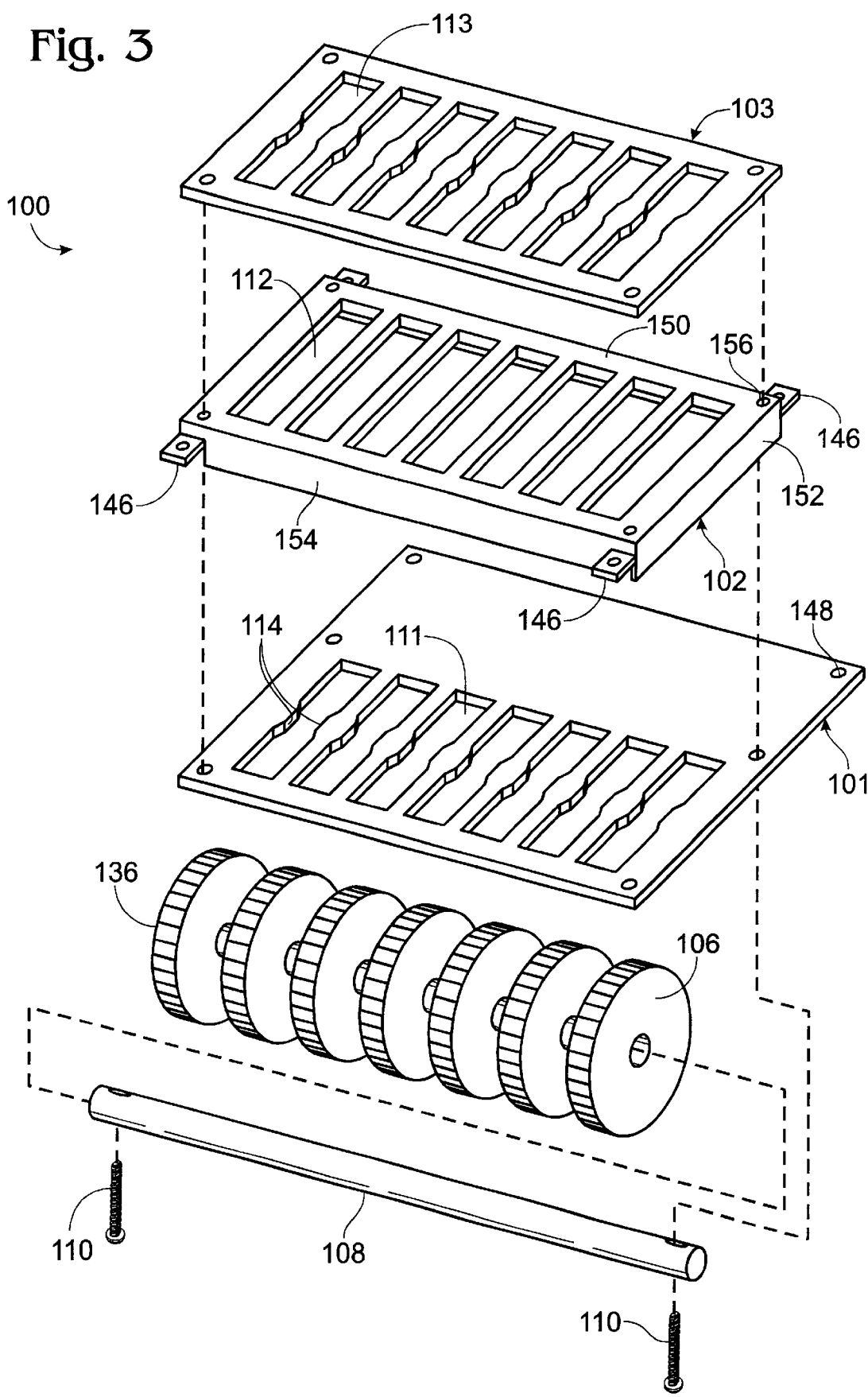

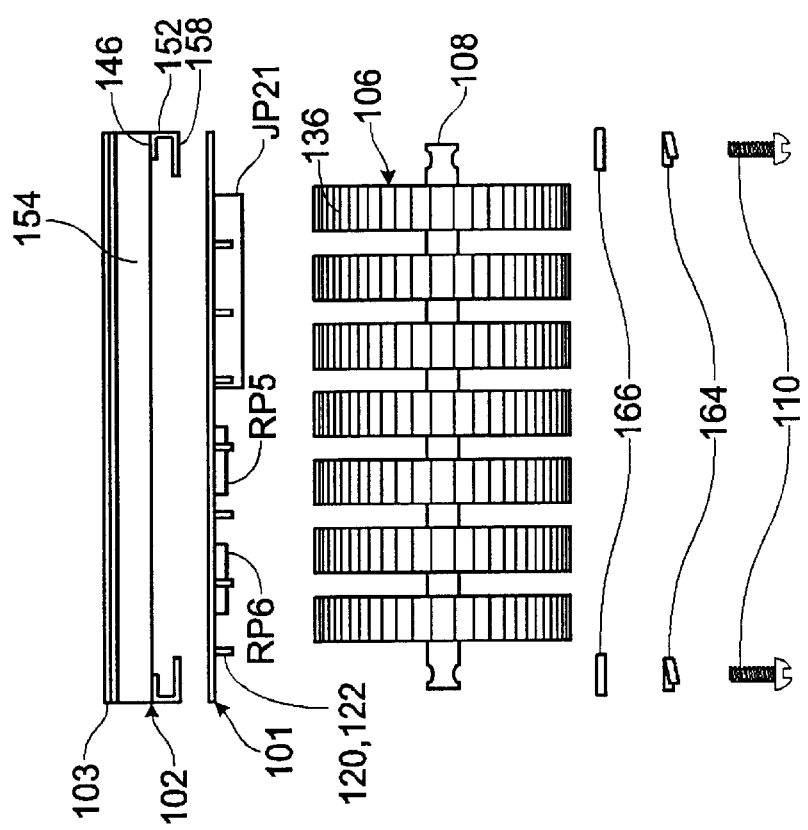
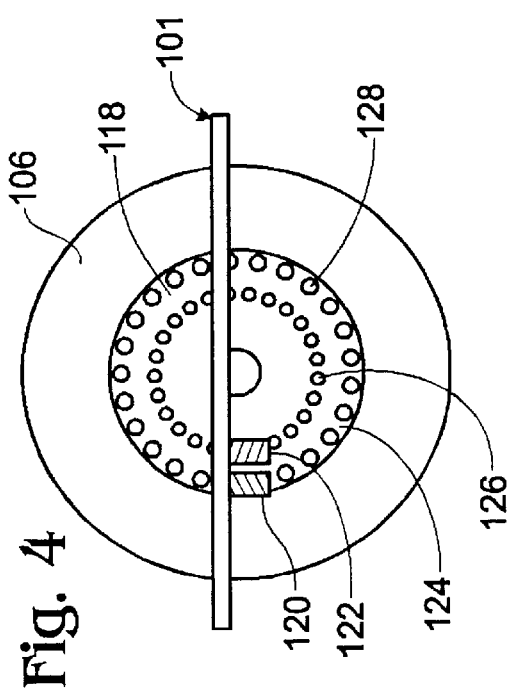
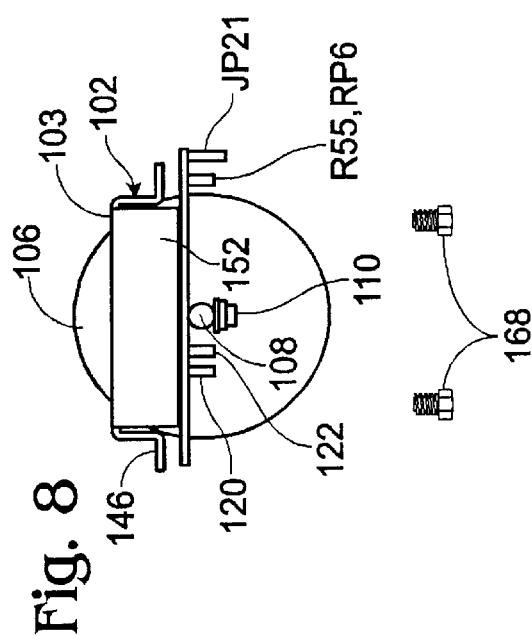

OPTICAL ENCODER HAVING MULTIPLE THUMBWHEELS WITH INTEGRAL ENCODER PATTERNS

BACKGROUND OF THE INVENTION

This application claims priority from U.S. Provisional Application No. 60/063,217 filed Oct. 23, 1997 which is incorporated by reference.

1. Field of the Invention

This invention relates generally to optical encoders, and more particularly to an optical encoder having multiple thumbwheels with integral encoder patterns.

2. Description of the Related Art

Control consoles for lighting control systems utilize thumbwheels to allow an operator to enter information into the system by turning the thumbwheels. Optical encoders are commonly used to convert rotary motion of the thumbwheels into electrical pulses, thereby allowing a microprocessor in the control system to sense how fast and in which direction the thumbwheel is being rotated.

FIG. 1 is an exploded view of a prior-art commercially available optical encoder. The encoder 10 includes an encoder disc 12 having an encoder pattern in the form of a circular track 14 of radially oriented lines 16 also referred to as elements. The disc is attached to the end of a shaft 18 which is supported in a cylindrical tube 20 that acts as a bearing. The tube 20 is attached to a cover 22 which encloses the disc 12 within a housing 24. The shaft 18 rotates within the tube, thereby causing the elements in the encoder pattern on the disc to move past sensor 26 which is mounted in the housing 24.

In this example, the disc is opaque, the pattern is comprised of dark elements on a light background, and the sensor is a transceiver that emits light towards the pattern and senses reflected light. As the disc spins in response to a knob or other device attached to the shaft, the alternating dark and light portions of the pattern cause the transceiver to generate electrical pulses that are modulated by how fast the disc is spinning. In other encoders, the disc is transparent with opaque elements, a light source is mounted on one side of the disc, and a receiver is mounted on the other side of the disc so that the light is alternately blocked or passed through the disc to the receiver.

FIG. 2 is a side view of a panel-mounted thumbwheel assembly that utilizes the commercially available optical encoder 10 of FIG. 1. Referring to FIG. 2, the encoder 10 is mounted to the back side of a control panel 28 with a bracket 30. The encoder is attached to the bracket by inserting the tube 20 into a hole in the bracket and securing it with a nut 32 which is threaded onto threads on the outside of tube 20. A thumbwheel 34 is attached to the shaft and protrudes through a slot in the control panel so that an operator can manipulate the thumbwheel from the top of the panel.

A problem with the assembly shown in FIG. 2 is that it is bulky and occupies a large amount of space under the panel. If more than two thumbwheel and encoder assemblies are required, they must be spaced a distance Y apart as this is the combined width of the thumbwheel and encoder. Thus, multiple thumbwheels on a single control panel consume excessive space. A further problem is that the commercially available encoder 10 is expensive. Yet another problem is that the assembly shown in FIG. 2 has a high parts-count, and therefore, is expensive and time-consuming to manufacture.

Accordingly, a need remains for an improved method and apparatus for utilizing thumbwheels to provide information to a control system.

SUMMARY OF THE INVENTION

It is therefore an object of the present invention to increase the density of multiple wheel encoders.

It is a further object of the present invention to reduce the cost of manufacturing thumbwheel encoders.

Another object of the present invention is to simplify the design and improve the reliability of thumbwheel encoders.

To achieve these and other objects, an encoder assembly in accordance with the present invention utilizes thumbwheels having encoder patterns formed integrally with the wheels. This reduces the space required to mount multiple thumbwheels on a control panel. An encoder pattern comprising two tracks of reflective dots is attached to the side of each wheel. Two optical transceivers are mounted on a printed circuit board next to each wheel so that the pattern elements in each of the tracks move past one of the transceivers as the wheels rotate. The transceivers send electrical pulses to a microprocessor each time a dot passes a transceiver. The dots in the two tracks are offset circumferentially to provide a 90 degree phase shift between the tracks as the wheels rotate on a common shaft. The use of dots reduces blurring of the pulse signals.

A chassis is mounted to the panel and supports the shaft, the printed circuit board, and a rubber dust shield which rubs against the wheels to provide braking action. The chassis, printed circuit board and dust shield all include slots through which the wheels rotate. Protrusions in the printed circuit board slots guide the wheels as they rotate, and protrusions in the dust shield slots rub against the sides of the wheels to provide the braking action.

One aspect of the present invention is an encoder assembly comprising: a wheel mounted so as to rotate about an axis perpendicular to the plane of the wheel, wherein the wheel includes an integral encoder pattern having a track of pattern elements; and a sensor positioned proximate the wheel such that the pattern elements in the track move past the sensor as the wheel rotates. The encoder assembly includes a second track of pattern elements, and further including a second sensor positioned proximate the wheel such that the pattern elements in the second track move past the second sensor as the wheel rotates.

Another aspect of the present invention is an encoder assembly comprising: a plurality of wheels mounted so as to rotate in parallel planes, wherein each wheel includes an integral encoder pattern having a track of pattern elements; and a plurality of sensors, wherein each sensor is positioned proximate a corresponding one of the wheels such that the pattern elements in the track on each of the wheels moves past the corresponding sensor as the wheels rotate.

A further aspect of the present invention is a control console comprising: a panel;
 a display having a plurality of display sections mounted on the panel; a plurality of wheels rotatably mounted to the panel proximate the display and arranged so that each wheel is aligned with a corresponding section of the display, wherein each wheel includes an integral encoder pattern having a track of pattern elements; and a plurality of sensors, wherein each sensor is positioned proximate a corresponding one of the wheels such that the pattern elements in the track on each of the wheels moves past the corresponding sensor as the wheel rotates.

An advantage of the present invention is that it provides an inexpensive multiple wheel encoder assembly that is compact enough to utilize commercially available displays.

Another advantage of the present invention is that it eliminates numerous components that are commonly used with encoders.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 is an exploded view of an embodiment of a multiple wheel encoder constructed in accordance with the present invention.

FIG. 4 is a side view of a portion of the encoder of FIG. 3.

FIG. 8 is a side view of the encoder of FIG. 3.

FIG. 9 is a partially exploded side view of the encoder of FIG. 3.

DETAILED DESCRIPTION

Figure 1:
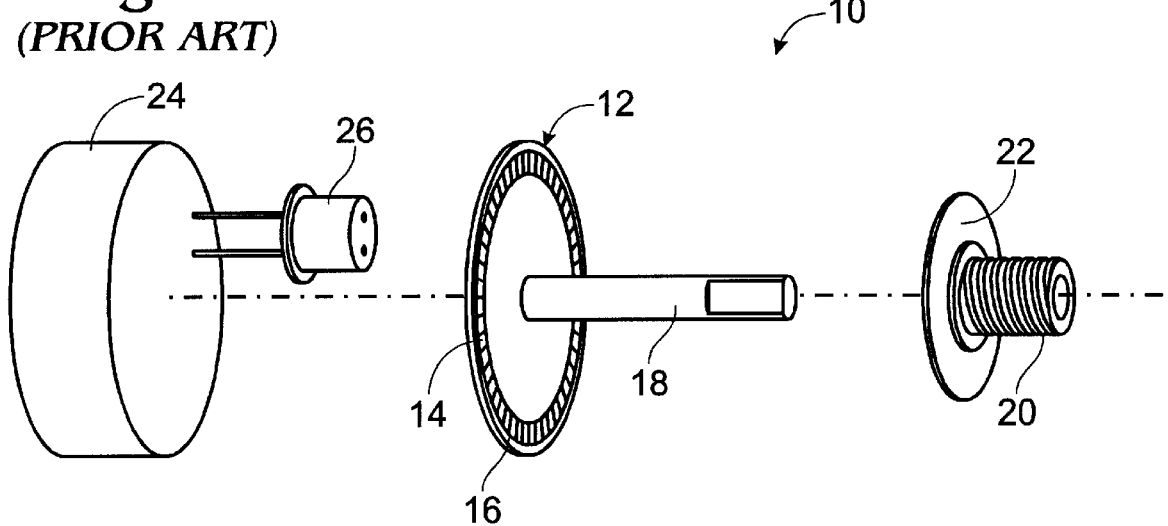
FIG. 1 is an exploded view of a prior art optical encoder.
Figure 2:
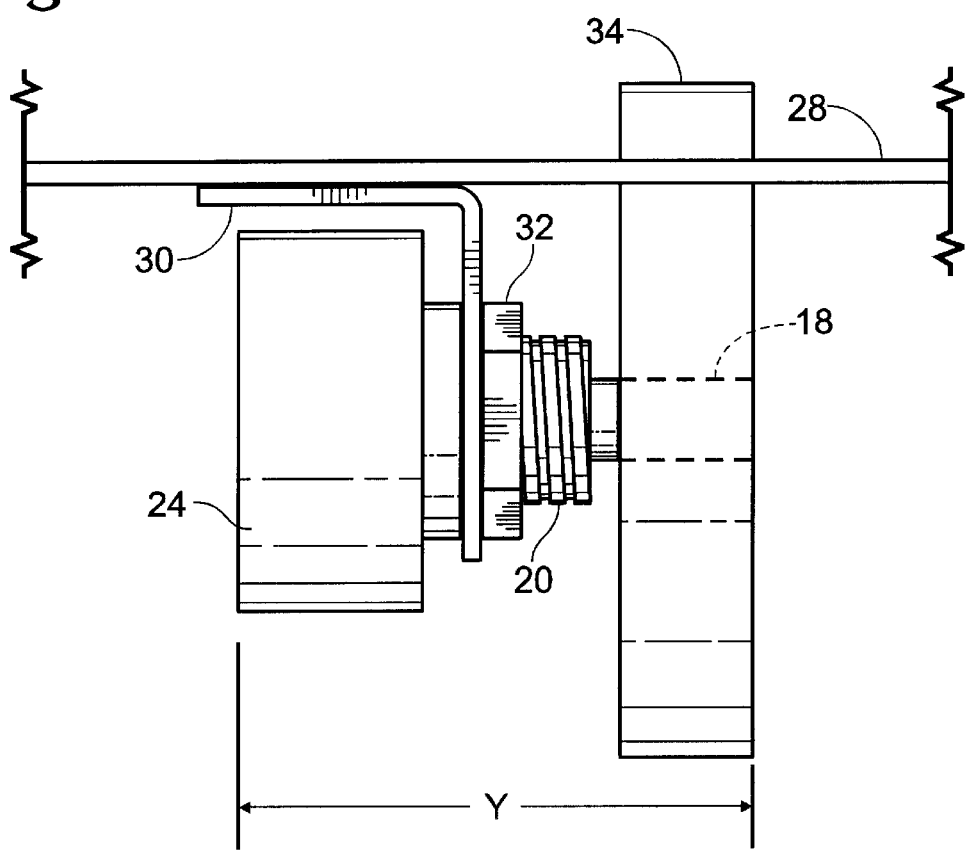
FIG. 2 is a side view of a panel-mounted thumbwheel assembly that utilizes the optical encoder of FIG. 1.
Figure 5:
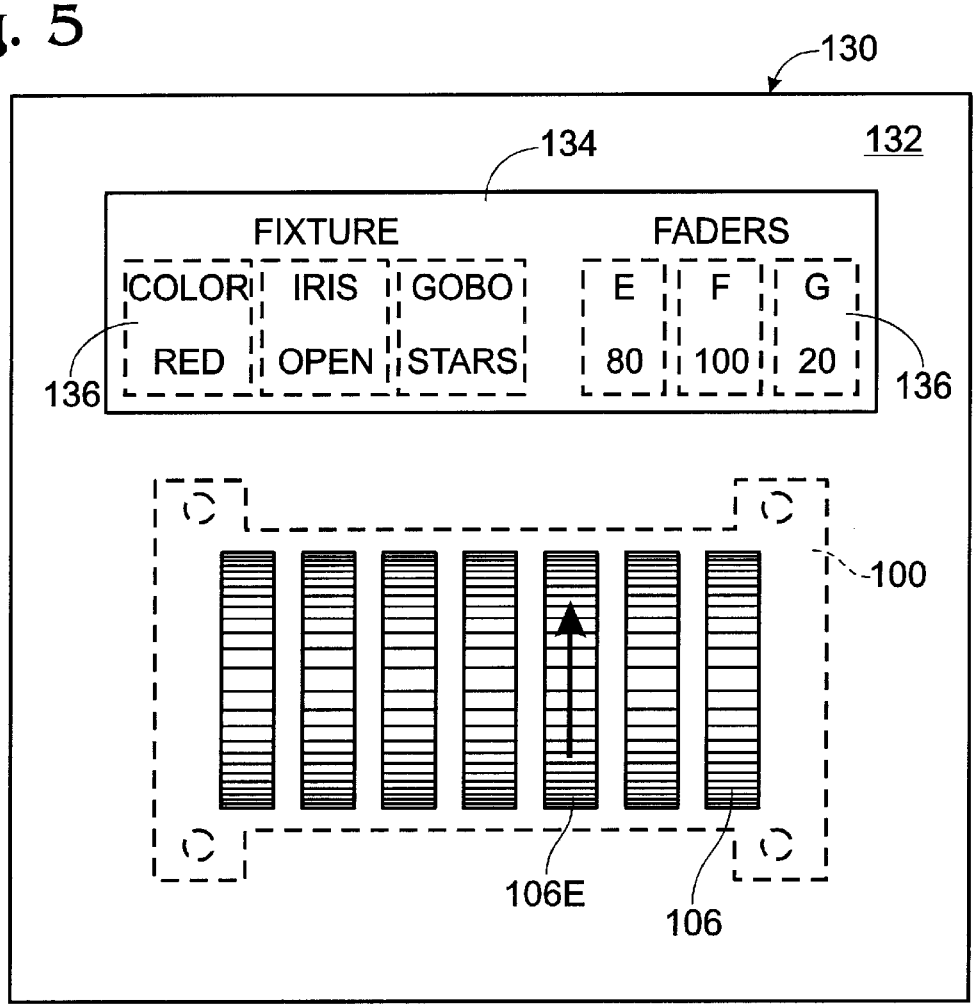
FIG. 5 is a view of the front panel of a control console utilizing the encoder of FIG. 3.
Figure 10:
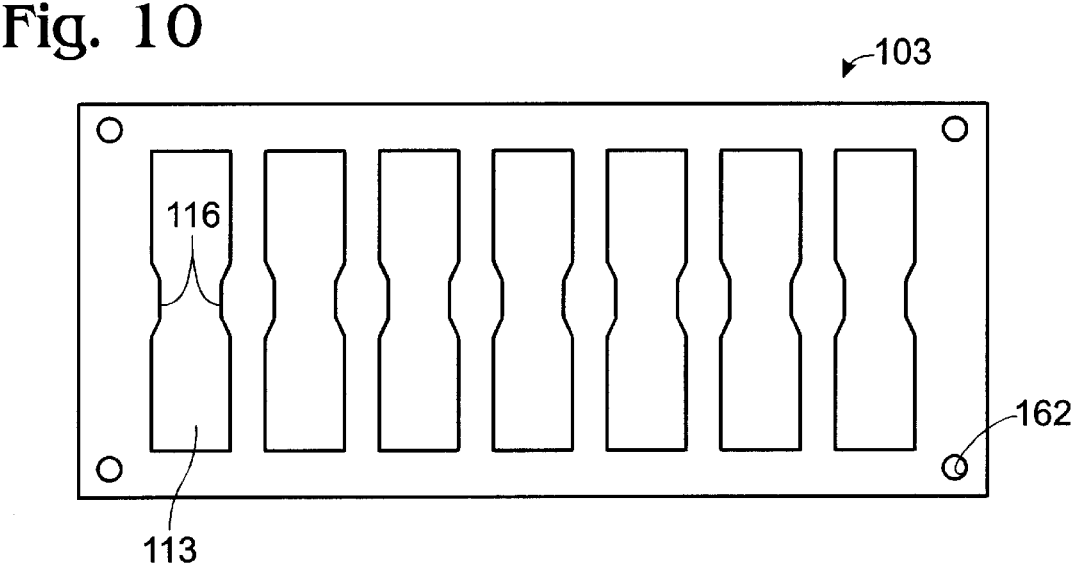
FIG. 10 is a top view of the dust shield of FIG. 3.

The structure of an embodiment of a multiple wheel encoder assembly in accordance with the present invention will now be provided with respect top FIGS. 3–5, followed by a brief summary of the operation. The structure will then be described in more detail followed by a more detailed description of operation.

Referring to FIG. 3, a multiple wheel encoder assembly 100 constructed in accordance with the present invention includes a printed circuit ("PC") board 101, chassis 102, a dust shield 103, a plurality of thumbwheels (seven in this embodiment) such as thumbwheel 106, and a shaft 108. The PC board 101, chassis 102, and dust shield 103 each have a plurality of parallel slots such as slots 111, 112, and 113, respectively. The PC board and dust shield are attached to the chassis such that each slot in the dust shield and PC board is aligned with a corresponding slot in the chassis. The thumbwheels are mounted on shaft 108 which is attached to the chassis such that each wheel protrudes through a slot in each of the chassis, PC board and dust shield.

Referring to FIG. 4, one side of each thumbwheel 106 includes an encoder pattern that is integral with the wheel. In the embodiment shown in FIG. 4, the pattern is printed on a label 118 that is attached to the side of the thumbwheel. The encoder pattern is comprised of two concentric tracks 124 and 126 of elements in the form of dots 128. The PC board 101 has two optical transceivers 120 and 122 mounted near each slot so that the elements in tracks 124 and 126 on each wheel move past transceivers 120 and 122, respectively, as the wheels rotate.

The encoder assembly 100 can be utilized in a control console 130 as shown in FIG. 5. Control console 130 includes a front panel 132 having a display device 134 that includes several display sections 136. The encoder assembly 100 (shown in broken lines) is mounted to the back of the panel 132 with the dust shield pressing against the back side of the panel. The panel 132 includes several slots so that the wheels 106 protrude through the slots to allow an operator to manipulate the thumbwheels from the top of the panel. Each thumbwheel is aligned with a corresponding section 136 of the display 134.

The transceivers in the encoder assembly send electronic pulses to a microprocessor in the control system, thereby allowing the control system to sense how fast and in which direction the operator is rotating the wheel. The control system provides feedback to the operator by displaying the value of the parameter associated with a particular wheel in the display segment that is aligned with the wheel. For example, the parameter shown as "80" under the "Faders" display section labeled "E" in FIG. 5 would increase as wheel 106E is rotated in the direction indicated by the arrow, and decrease as the wheel is rotated in the opposite direction.

Because the encoder patterns are formed integrally with the wheels, very little space is required between the wheels, so numerous wheels can be packed into a small space on the control panel, thereby increasing the amount of control inputs that can be provided on a control console. It also allows more efficient utilization of the display 134.

More detailed consideration will now be given to the structure of the encoder assembly 100 of FIG. 3.

Referring to FIGS. 4 and 6A–6C, each wheel 106 is cut from a length of extruded aluminum that has ribs 136 located around the entire circumference of the extrusion to provide a comfortable finger grip for rotating the wheel. A hole at the center of the wheel receives a commercially available cylindrical bushing 138 that acts as a bearing to support the wheel on shaft 108. In a preferred embodiment, the entire wheel is flat black so that it does not reflect ambient light.

To provide an integral encoder pattern on the wheel, a circular label 118 having an outer track 124 and inner track 126 of white dots 128 is attached to the side of the wheel with adhesive. Each track includes 25 dots arranged in a circle centered on the center point of the wheel and label and spaced equally around the track. The dots in the outer track are larger than the dots in the inner track so that the dots in both tracks occupy the same angular dimension around the track measured in degrees. Dots have been determined to provide better performance as encoder elements than stripes and segments which appear as gray blurs and confuse the transceivers. The dots are white, and the space in between the dots is flood filled with flat black ink.

Figure 6A:
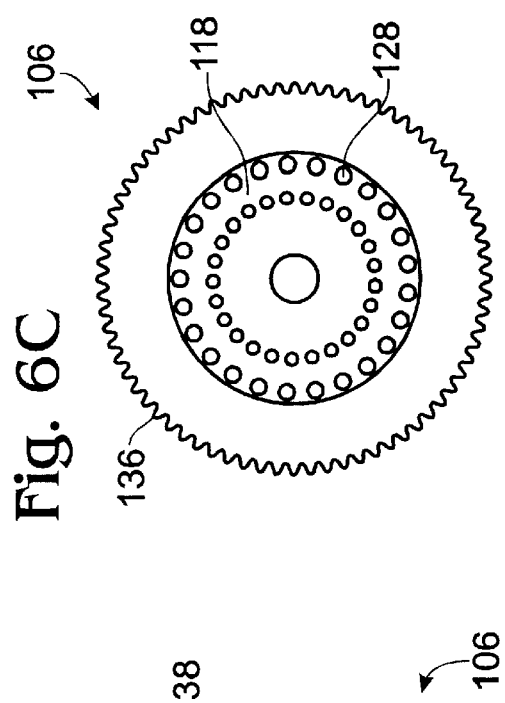
FIGS. 6A–6D are views showing details of the thumbwheel of FIG. 3.
Figure 6B:
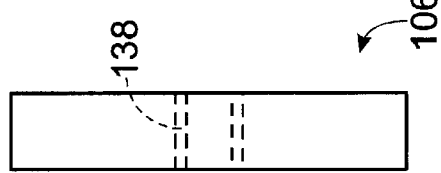
Figure 6C:
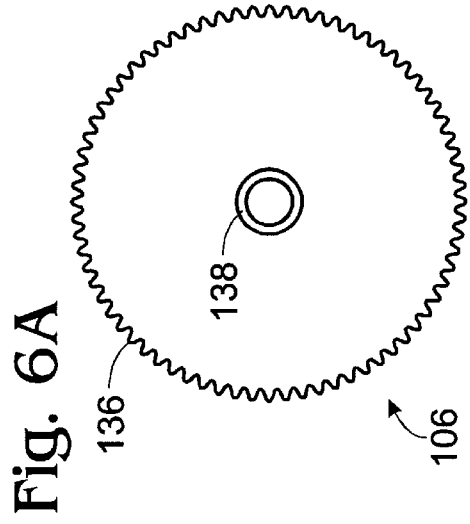
Figure 6D:
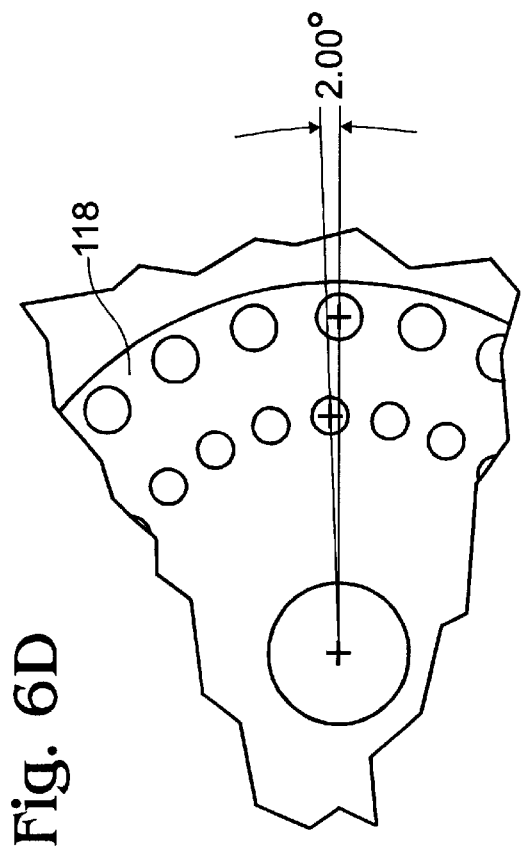

Referring to FIG. 6D, the dots in the two tracks are offset circumferentially to create a 90 degree phase shift (quadrature differential) between the pulses transmitted by the inner transceivers 122 and outer transceivers 124 shown in FIG. 4. An offset of 2 degrees was found to provide the proper phase shift with 25 dots per track.

Label 118 can be manufactured economically by utilizing the same process and materials commonly used for making name plates, rating plates, and other labels for electrical equipment.

Referring again to FIG. 3, shaft 108 is made from plated steel and sprayed with a dry lubricant before assembling with the wheels 106. A hole is drilled through the shaft at either end to receive mounting screws 110.

Figure 7:
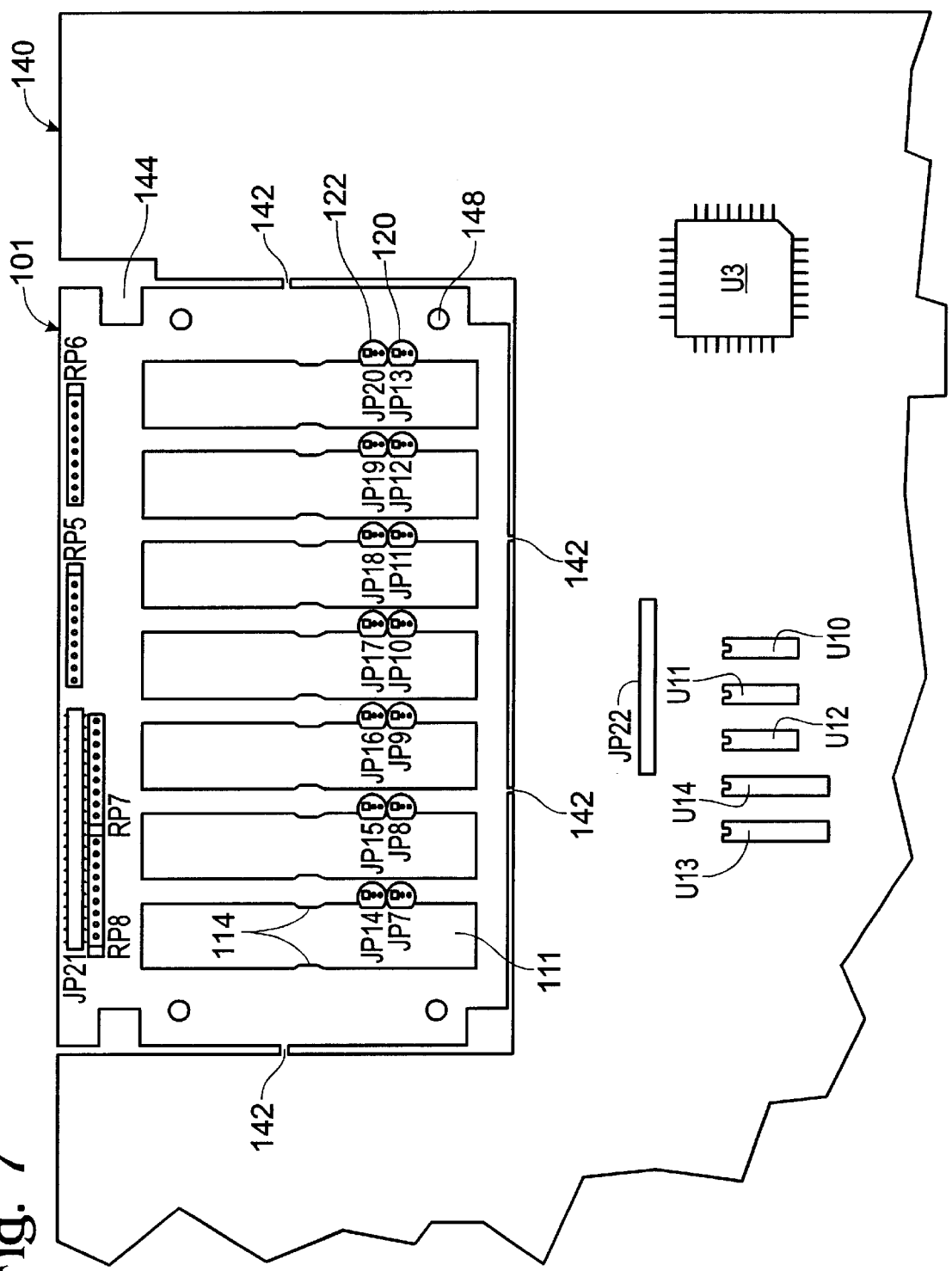
FIG. 7 is a top view of the printed circuit board assembly of FIG. 3 shown attached to a larger printed circuit board for manufacturing purposes.

Referring to FIGS. 4, 7 and 9, PC board 101 is made from conventional fiberglass materials, and in a preferred embodiment, it is fabricated as part of a master PC board 140 for a control console. The master PC board 140 is cut so that PC board 101 is separated from the master PC board around its entire periphery except at a few attachment points 142. After all parts are inserted and soldered on both boards, the PC board 101 is snapped from the master PC board by breaking the attachment points.

Referring to FIGS. 3 and 7, PC board 101 includes a plurality of parallel slots 111 for receiving the wheels 106. There are as many slots as wheels. Each slot has a pair of tabs 114 protruding from adjacent sides of the slot at the center of the slot. The tabs 114 engage the sides of the wheel and guide the wheel as it rotates in the slot to prevent it from rubbing against the slots in the chassis. A notch 146 near each corner of the PC board allows access to mounting screws that pass through holes in tabs 144 of the chassis 102. Four mounting holes 148 are provided for attaching the PC board to the chassis.

Referring to FIGS. 4, 7 and 9, a pair of optical transceivers 120 and 122 are mounted on the PC board 101 next to each slot 111 so as to line up with the tracks 124 and 126, respectively, on the wheel that rotates in the slot. In this embodiment, there are seven wheels 106, so there are seven pairs of transceivers next to seven slots on the PC board. (The transceivers are also designated as JP7–JP20 for reference in the schematic of FIG. 11.) The transceivers 120 and 122 are preferably industry standard type HLC 1395-001 non-focused reflective type devices manufactured by Honeywell and are aligned so that the transmitter portion emits light directed at the dots on the corresponding track and the receiver portion receives light reflected back from the dots. The transceiver for both tracks on each wheel are preferably located on the same side of the shaft 108 as shown in FIG. 4, since locating the transceiver for one track on one side of the shaft and the transceiver for the other track on the other side of the shaft has been found to result in errors due to misalignment caused by flexing of the PC board under finger pressure as the operator rotates the wheel.

Referring to FIGS. 7, 8 and 9, PC board 101 also includes a connector JP21 for connecting the PC board 101 to the master PC board 140 in the control console, and resistor packs RP5, RP6, RP7, and RP8 for biasing the transceivers as will be described in more detail below. Resistor packs RP5 and RP6 are industry standard, eight resistor 270 ohm devices, and resistor packs RP7 and RP8 are industry standard, eight resistor 8.2K ohm devices.

Figure 11:
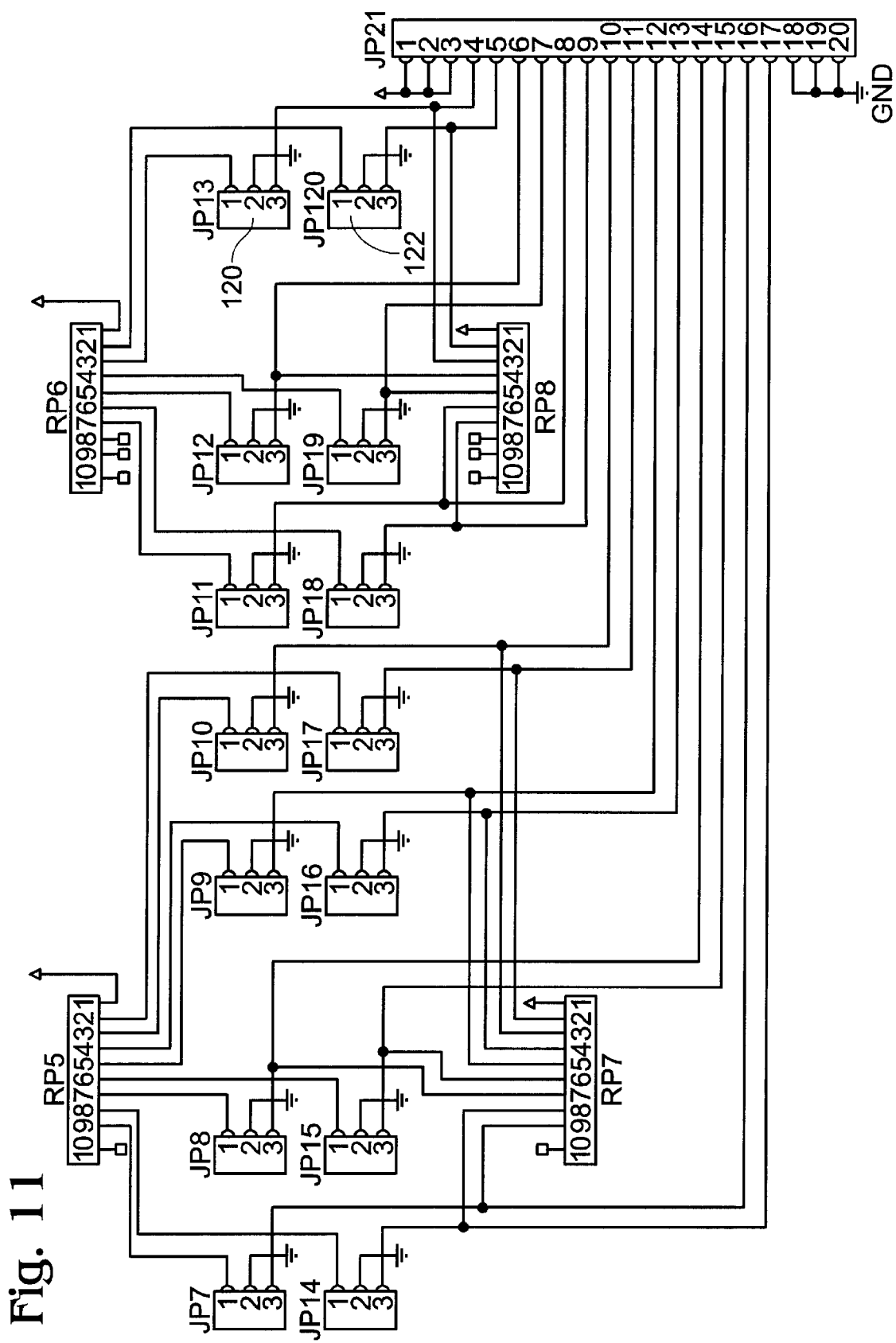
FIG. 11 is a schematic diagram of the printed circuit board of FIG. 3.

FIG. 11 is a schematic diagram of the printed circuit board 101. Referring to FIG. 11, connector JP21 receives power supply and ground signals +5V and GND, respectively, which are distributed throughout the board. Pin 2 of each transceiver is connected to ground, while pin 1 of each transceiver is coupled to +5V through pull-up resistors in resistor packs RP5 and RP6. The output pin 3 on each transceiver is coupled to ground through pull-down resistors in resistor packs RP7 and RP8. The output pin 3 on each transceiver is also coupled to a corresponding pin on connector JP21 so as to send its output pulses to a conditioning circuit and microprocessor on master PC board 140 through connector JP21.

In the conditioning circuit on a preferred embodiment of the master PC board 140, the output pulse signal from each transceiver is inverted by an industry standard type 4584 CMOS Schmitt trigger (U10–U12) and then read by a microprocessor U3 through industry standard type 74HC373 latches (U13–U14) operating as tri-state buffers. The Schmitt triggers should have low hysterisis, and the switching points should be centered near the middle of the logic voltage range. The processor then utilizes the pulse signals to determine the speed and direction of rotation of each wheel and display appropriate feedback information and settings on the display 134 as shown in FIG. 5. In the example shown in FIG. 5, the three wheels on the left are used to enter information on moving lights into the system, and the three wheels on the right enter level settings for dimmers into the system.

Referring to FIGS. 3, 8 and 9, the chassis 102 is folded from 0.062 inch thick aluminum sheet. The chassis is generally box-shaped and has a top plate 150 with seven slots 112 for receiving wheels 106 and mounting alignment holes 156 for aligning the dust shield 103. The chassis also has two short sides 152, and two long sides 154. Each long side 154 has a mounting tab 146 located at either end for mounting the chassis to the back of a control panel. The short sides 152 have a greater depth than the long sides and are folded at the back to form back plates for mounting the PC board 101 and shaft 108 to the chassis.

Referring to FIGS. 3 and 5, dust shield 103 is cut from 0.025 inch thick black rubber, preferably CI FAIRPRENE type 5039 02435. The dust shield 103 includes seven slots 113 for receiving the wheels 106, and an alignment hole 162 at each corner for aligning the dust shield with the chassis 102. The width of each slot is slightly smaller (about 0.03 inches smaller) than the width of the corresponding slots in the chassis. Each slot in the dust shield 103 also includes a pair of opposing tabs 116 that protrude from the sides of the slot and rub against the sides of wheels 106 to provide breaking action to prevent each wheel from rotating once the operator stops turning it.

A method for assembling the encoder assembly 100 will now be described with reference to FIGS. 3, 6A–6C, 8 and 9. A bushing 138 is pressed into the central hole in each wheel 106. The wheel is mounted on an assembly tool having an alignment pin and outside diameter slightly smaller the inside diameter of the bushing 138. Label 118 is then slid down over the alignment pin and attached to the wheel with adhesive.

Dust shield 103 is attached to the front face of chassis 102 with adhesive using assembly tool that has two alignment pegs for aligning holes 162 on the dust shield 103 with holes 156 on the chassis.

Wheels 106 (having labels 118 attached) are slipped onto shaft 108 which is lubricated with a dry lubricant. The wheels 106 are spaced apart using an assembly template that is virtually identical to chassis 102. PC board 101 is slipped over the wheels so that the wheels protrude through the slots 111 in the board. Chassis 102 having dust shield 103 attached is slipped over the wheels, and shaft 108 is attached to the chassis with the PC board sandwiched between the chassis and shaft. The shaft is attached to the chassis with washers 166, lock washers 164, and screws 110 that thread into holes on back faces 158. The PC board is then attached to the chassis with two screws 168 on either side that also thread into holes on the back faces 158 of chassis 102.

Referring to FIG. 5, the encoder assembly 100 is then mounted to the backside of control panel 132 using standoffs and screws that pass through the holes in tabs 146. The dust shield 103 butts up against the back side of the control panel. The control panel can either have one large cutout for all of the wheels, or individual slots for each wheel. The encoder assembly is then electrically coupled to the master PC board 140 through connector JP21 which interconnects with connector JP22 on the master PC board.

In operation, the dust shield 103 blocks dirt and ambient light from entering the encoder assembly. The chassis 102 holds shaft 108, and thus, the wheels 106, at the proper distance from the control panel. The chassis also supports the PC board 101 in the proper position so that the transceivers JP7–JP20 are aligned with the tracks of encoder elements on the wheels. The transceivers JP7–JP20 send a pulse to the microprocessor U3 each time a dot passes the transceiver. By detecting which of the pulses from transceivers 120 and 122 (JP13 and JP20, respectively) are generated first, software in the microprocessor can determine the direction in which the wheel is rotating. Software in the microprocessor can also determine the speed as which the wheel is rotating by observing the time delay between pulses on one of the transceivers.

Because the microprocessor U3 reads the buffered and latched pulses from the encoder 100 directly, components such as external counters (which are typically used to read encoder outputs) are eliminated, thereby simplifying the design of the system and reducing the component count and manufacturing cost.

The encoder assembly 100 described above provides a simple and robust technique for utilizing thumbwheels to enter information into a control console. The bearing system is simple and eliminates cantilever forces that tend to cause misalignment and reduce reliability. The present invention provides the cost and size reduction necessary to make multiple wheel optical encoders practical, and to allow the encoders to line up with display sections on readily available LCD displays and other types of display devices. It should also be noted that, although an embodiment having seven wheels is described above, the concepts of the present invention can be extended to encoder assemblies having fewer or more wheels.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. An encoder assembly comprising:
   a plurality of wheels mounted so as to rotate about an axis perpendicular to the wheels, wherein each wheel includes an integral encoder pattern having a track of pattern elements; and
   a plurality of sensors, each sensor positioned proximate a corresponding one of the wheels such that the pattern elements in the track of each of the wheels move past the corresponding sensor as each wheel rotates;
   wherein each wheel can rotate independently.

2. An encoder assembly according to claim 1 wherein the encoder pattern includes a second track of pattern elements, and further including a second sensor positioned proximate the wheel such that the pattern elements in the second track move past the second sensor as the wheel rotates.

3. An encoder assembly comprising:
   a wheel mounted so as to rotate about an axis perpendicular to the plane of the wheel, wherein the wheel includes an integral encoder pattern having a first track of pattern elements;
   a first sensor positioned proximate the wheel such that the pattern elements in the first track move past the sensor as the wheel rotates; and
   a second track of pattern elements, and further including a second sensor positioned proximate the wheel such that the pattern elements in the second track move past the second sensor as the wheel rotates;
   wherein the elements in the second track are offset from the elements in the first track to create a 90 degree phase shift between the first sensor and the second sensor.

4. An encoder assembly according to claim 1 wherein:
   the elements in the track are reflective; and
   the sensor is an optical transceiver arranged so as to direct light toward the elements and receive light reflected back from the elements.

5. An encoder assembly comprising:
   a wheel mounted so as to rotate about an axis perpendicular to the plane of the wheel, wherein the wheel includes an integral encoder pattern having a track of pattern elements; and
   a sensor positioned proximate the wheel such that the pattern elements in the track move past the sensor as the wheel rotates;
   wherein the elements are dots.

6. An encoder assembly comprising:
   a wheel mounted so as to rotate about an axis perpendicular to the plane of the wheel, wherein the wheel includes an integral encoder pattern having a track of pattern elements; and
   a sensor positioned proximate the wheel such that the pattern elements in the track move past the sensor as the wheel rotates;
   wherein the pattern is printed on a label affixed to a side of the wheel.

7. An encoder assembly comprising:
   a wheel mounted so as to rotate about an axis perpendicular to the plane of the wheel, wherein the wheel includes an integral encoder pattern having a track of pattern elements; and
   a sensor positioned proximate the wheel such that the pattern elements in the track move past the sensor as the wheel rotates; and
   a dust shield having a slot for receiving the wheel and arranged to prevent dust from interfering with the encoder assembly.

8. An encoder assembly according to claim 7 wherein the dust shield is constructed so as to rub against the wheel, thereby providing braking action.

9. An encoder assembly according to claim 8 wherein the slot in the dust shield includes a protrusion for rubbing against the wheel.

10. An encoder assembly according to claim 9 wherein the dust shield is made of rubber.

11. An encoder assembly comprising:
    a wheel mounted so as to rotate about an axis perpendicular to the plane of the wheel, wherein the wheel includes an integral encoder pattern having a track of pattern elements; and
    a sensor positioned proximate the wheel such that the pattern elements in the track move past the sensor as the wheel rotates; and
    a printed circuit board having a slot for receiving the wheel, wherein the sensor is mounted on the printed circuit board.

12. An encoder assembly according to claim 11 wherein the printed circuit board includes a protrusion extending from a side of the slot for guiding the wheel.

13. An encoder assembly according to claim 12 wherein the printed circuit board includes a second protrusion extending from a second side of the slot opposite the first protrusion for guiding the wheel.

14. An encoder assembly according to claim 11 further including:
   a shaft for supporting the wheel; and
   a chassis coupled to the shaft and printed circuit board so as to support the printed circuit board and shaft in a plane perpendicular to the plane of the wheel, wherein the chassis is constructed such that the wheel protrudes through a panel when the chassis is mounted to the panel.

15. An encoder assembly comprising:
   a plurality of wheels mounted so as to rotate independently in parallel planes, wherein each wheel includes an integral encoder pattern having a track of pattern elements; and
   a plurality of sensors, wherein each sensor is positioned proximate a corresponding one of the wheels such that the pattern elements in the track on each of the wheels moves past the corresponding sensor as the wheels rotate.

16. An encoder assembly according to claim 15 further including:
   a shaft passing through the wheels so as to rotatably support the wheels on a common axis;
   a printed circuit board having a plurality of slots for receiving the plurality of wheels, wherein the plurality of sensors are mounted on the printed circuit board; and
   a chassis arranged to support the shaft and the printed circuit board such that the wheels rotate in the slots in the printed circuit board, the chassis being adapted to attach the encoder assembly to a panel so that the wheels protrude through the panel.

17. An encoder assembly according to claim 16 further including a dust shield attached to the chassis, wherein the dust shield includes a plurality of slots for receiving the plurality of wheels.

18. An encoder assembly according to claim 17 wherein:
   each slot in the printed circuit board includes a pair of protrusions for guiding the wheels as they rotate; and
   each slot in the dust shield includes a pair of protrusions for rubbing against the wheel, thereby providing braking action.

19. An encoder assembly according to claim 15 wherein the integral encoder pattern on each wheel further includes a second track of pattern elements, and further including a second plurality of sensors, wherein each of the second plurality of sensors is positioned proximate a corresponding one of the wheels such that the pattern elements in the second track on each of the wheels moves past the corresponding one of the second plurality of sensors as the wheels rotate.

20. An encoder assembly according to claim 15 wherein the pattern elements are dots.

21. A control console comprising:
   a panel;
   a display having a plurality of display sections mounted on the panel
   a plurality of wheels rotatably mounted to the panel proximate the display and arranged so that each wheel rotates independently, protrude through the panel, and is aligned with a corresponding section of the display, wherein each wheel includes an integral encoder pattern having a track of pattern elements; and
   a plurality of sensors, wherein each sensor is positioned proximate a corresponding one of the wheels such that the pattern elements in the track on each of the wheels moves past the corresponding sensor as the wheel rotates.

22. A control console according to claim 21 further including a printed circuit board mounted to the panel, the printed circuit board having a plurality of slots for receiving the plurality of wheels, wherein the plurality of sensors are mounted on the printed circuit board.

23. A control console according to claim 21 further including a dust shield attached to the panel, wherein the dust shield includes a plurality of slots for receiving the plurality of wheels.

24. A control console according to claim 23 wherein the dust shield rubs against the wheels, thereby providing braking action.

25. A control console according to claim 24 wherein each slot in the dust shield includes a protrusion for rubbing against the wheel.

26. A control console according to claim 21 wherein the integral encoder pattern on each wheel further includes a second track of pattern elements, and further including a second plurality of sensors, wherein each of the second plurality of sensors is positioned proximate a corresponding one of the wheels such that the pattern elements in the second track on each of the wheels moves past the corresponding one of the second plurality of sensors as the wheels rotate.

27. A control console according to claim 21 wherein the encoder pattern is a concentric ring of dots.

28. An encoder assembly according to claim 3 wherein each track comprises 25 elements, and each element in the first track is offset circumferentially 2 degrees from a corresponding element in the second track.

* * * * *